United States Patent [19]
Stelzer

[11] 3,980,343
[45] Sept. 14, 1976

[54] LOAD RESPONSIVE PROPORTIONING VALVE

[75] Inventor: William Stelzer, Milford, Mich.

[73] Assignee: Kelsey-Hayes Company, Romulus, Mich.

[22] Filed: June 27, 1975

[21] Appl. No.: 591,071

Related U.S. Application Data

[63] Continuation of Ser. No. 381,915, July 23, 1973, abandoned.

[52] U.S. Cl. ............................. 303/6 C; 188/349; 303/24 C
[51] Int. Cl.² .......................................... B60T 13/06
[58] Field of Search ............... 303/6 C, 22 R, 22 A, 303/24, 21 R, 21 CG, 21 F, 84 R, 84 A; 188/195, 181 A, 349, 275

[56] References Cited
UNITED STATES PATENTS

| | | | |
|---|---|---|---|
| 3,377,108 | 4/1968 | Eddy | 303/6 C |
| 3,403,946 | 10/1968 | Thirion | 303/21 CG |
| 3,423,936 | 1/1969 | Stelzer | 303/6 C |
| 3,475,059 | 10/1969 | Klein | 303/22 A |
| 3,721,475 | 3/1973 | Kawase et al. | 303/21 CG |
| 3,738,711 | 6/1973 | Rockwell et al. | 303/21 F |
| 3,825,303 | 7/1974 | Yabuta | 303/6 C |
| 3,881,786 | 5/1975 | Stelzer et al. | 303/6 C |

FOREIGN PATENTS OR APPLICATIONS

1,475,627 4/1967 France .......................... 303/24 R

Primary Examiner—Stephen G. Kunin
Assistant Examiner—Galen L. Barefoot
Attorney, Agent, or Firm—Harness, Dickey & Pierce

[57] ABSTRACT

A load responsive proportioning valve for use on a vehicle having a source of hydraulic fluid and front and rear wheel hydraulically actuated brake systems, the assembly including proportioning valve means in one of the brake systems actuatable to modulate the brake pressure in that one system to provide for a reduced brake effect at the rear brake wheels relative to that of the front wheels to compensate for weight transfer during braking, the proportioning valve means including a piston member movable between positions opening and closing a flow path from the fluid source to the one brake system, bias means including a fluid spring providing a force to move the piston member toward one of the positions, and deceleration sensing means for controlling the magnitude of the fluid spring as a function of variations in the magnitude of deceleration of the vehicle, whereby the modulating effect of the proportioning valve means compensates for variations in loading of the vehicle.

22 Claims, 6 Drawing Figures

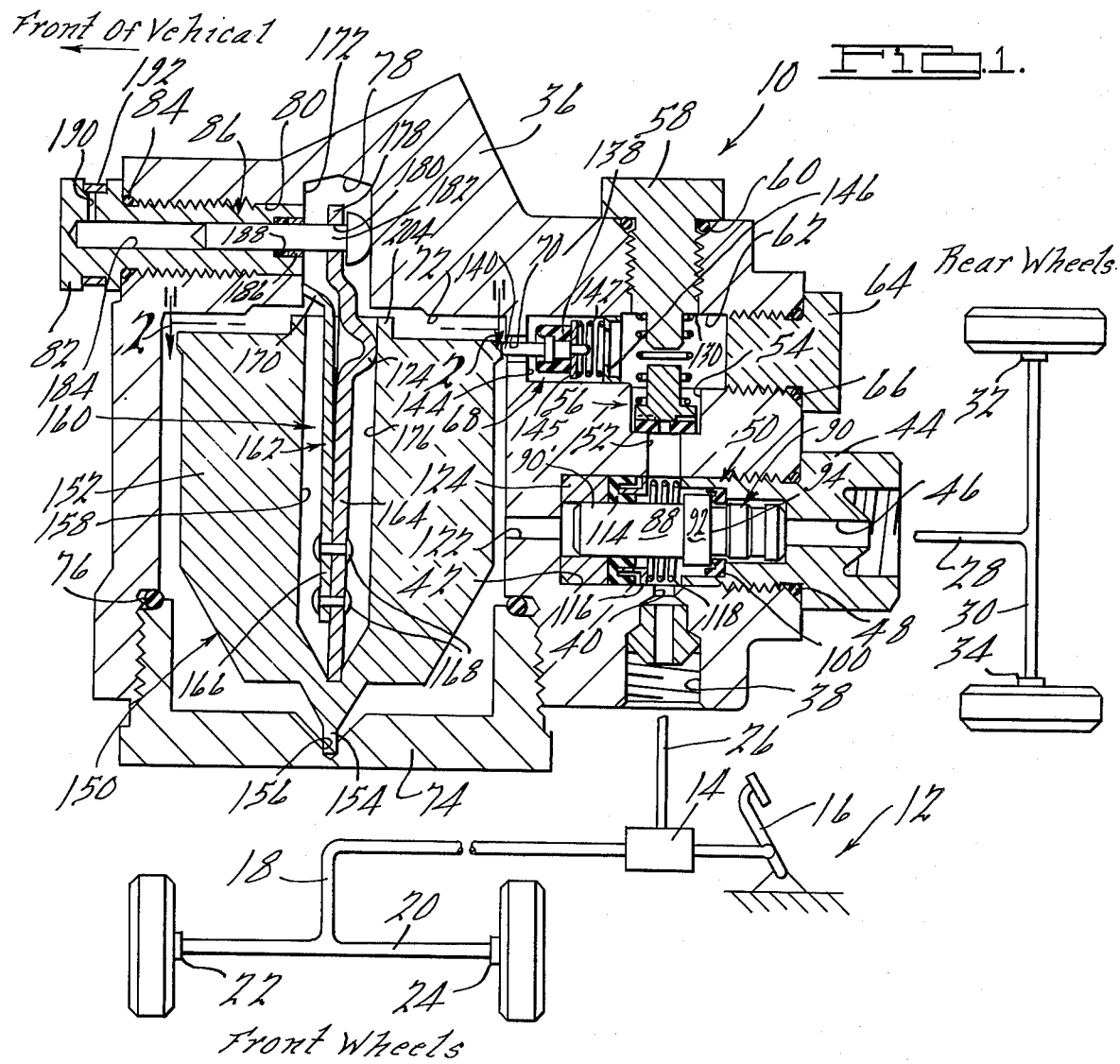

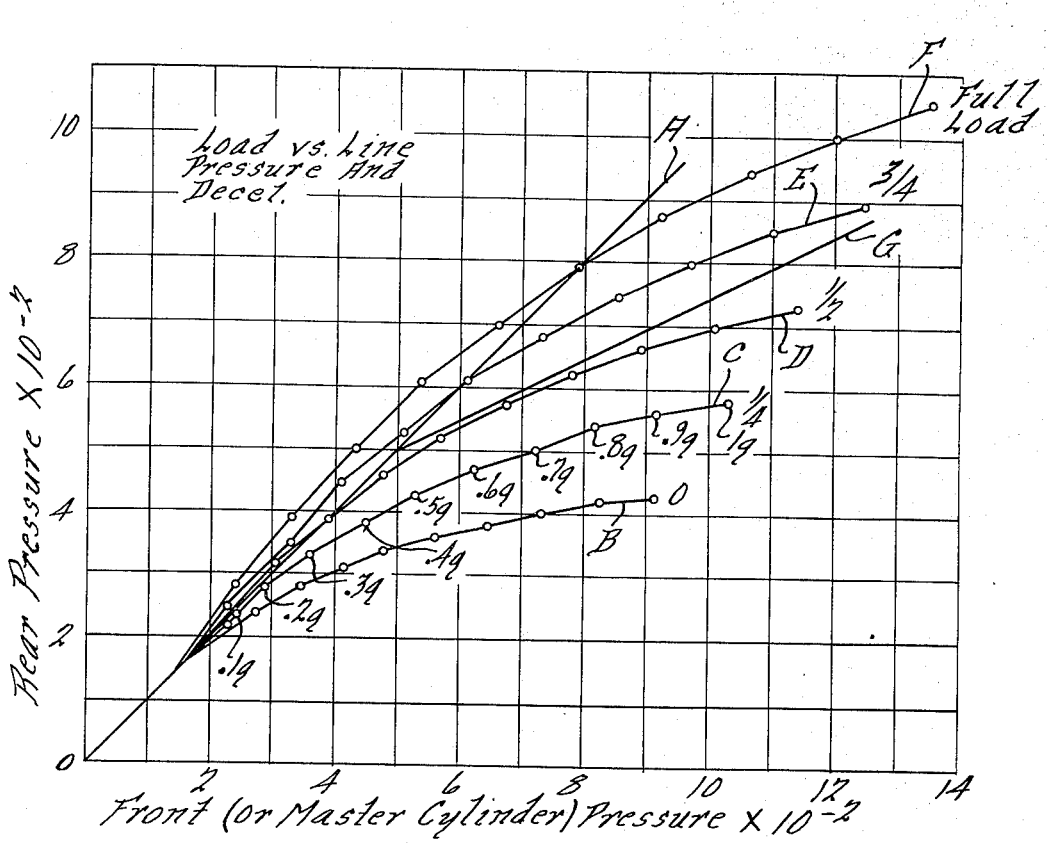
FIG. 4.
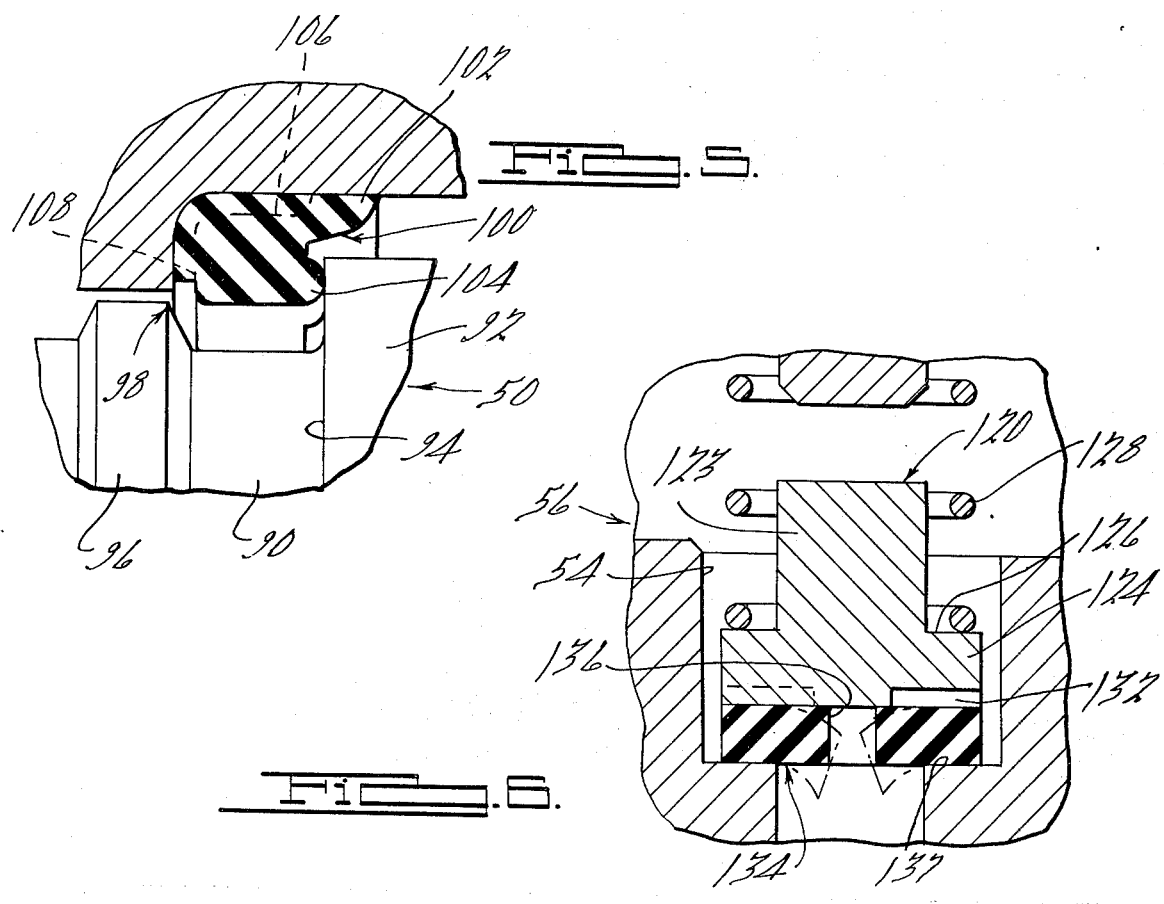
FIG. 5.
FIG. 6.

LOAD RESPONSIVE PROPORTIONING VALVE

This is a continuation of application Ser. No. 381,915, filed July 23, 1973, now abandoned.

BACKGROUND OF THE INVENTION

1. Field of the Invention

Proportioning devices for vehicle hydraulic brake systems.

2. Description of the Prior Art

In conventional proportioning valves for hydraulic vehicular brake systems, the effect of weight transferred from the rear wheels to the front wheels during a braking operation is compensated such that upon attainment of a selected level of output pressure from the master cylinder of the associated brake system, further pressure increases to the rear brakes occur at a preselected ratio, resulting in the brake pressure applied to the rear brake system being predeterminately less than the master cylinder pressure. The purpose of this, of course, is to deter premature lockup of the rear wheels during braking as the weight is transferred from the rear wheels to the front wheels of the associated vehicle.

Although proportioning valves heretofore known and used in the prior art have been capable of closely approximately the idealized relationship between the pressure to the front brakes (often the master cylinder) and the pressure to the rear brakes, under various loading conditions, there can be substantial deviation between the idealized relationship and the actual performance of the proportioning valves. The problem of modifying the operation of proportioning valves in accordance with the vehicle loading has been approached in a number of different ways, primarily through the use of various connections or linkages between the proportioning valves and the associated vehicle suspensions; however, such arrangements have been objectionable due to the space requirements for the connecting elements and the expense involved in manufacturing, installing and maintaining the same.

The invention disclosed in the U.S. Pat. No. 3,881,786 and assigned to the assignee of the present application, overcomes a number of the objectionable characteristics of load sensitive proportioning valves which sensed suspension loading of the associated vehicle, and the present invention is related to and consists of an improvement over the valve assembly shown in the aforementioned application.

SUMMARY OF THE INVENTION

This invention relates generally to vehicular braking systems, and more particularly, to a new and improved load sensitive proportioning valve for controlling the pressure of the brake fluid supply to the rear brake system of a vehicle in accordance with variations in vehicle loading.

It is, accordingly, a general object of the present invention to provide a new and improved vehicle braking system of the above described character.

It is a more particular object of the present invention to provide a new and improved load sensitive proportioning valve which embodies a number of improvements over the proportioning valve shown in aforementioned U.S. Pat. No. 3,881,786.

It is yet a more particular object of the present invention to provide a new and improved load sensitive proportioning valve which minimizes the friction imposed upon the proportioning piston or member by the associated fluid seals, whereby to provide for highly improved accuracy over prior art designs.

It is another most particular object of the present invention to provide a new and improved load sensitive proportioning valve wherein the bias force acting upon the proportioning piston consists of a fluid spring, the effect of which is controlled by a deceleration responsive element within the valve assembly.

It is another object of the present invention to provide a new and improved load sensitive proportioning valve which requires no ancillary connections with the vehicle suspension.

It is still a further object of the present invention to provide a new and improved load sensitive proportioning valve which is of a relatively simple design, is economical to manufacture, easy to assemble, and which will have a long and effective operational life.

Other objects and advantages of the present invention will become apparent from the following detailed description taken in conjunction with the accompanying drawings.

BRIEF DESCRIPTION OF THE DRAWINGS

FIG. 1 is a partial schematic diagram of a vehicular brake system with the load sensitive proportioning valve of the present invention shown in operative association therewith;

FIG. 2 is a transverse cross-sectional view taken substantially along the line 2—2 of FIG. 1;

FIG. 3 is an enlarged fragmentary cross-sectional view taken substantially along the line 3—3 of FIG. 2;

FIG. 4 is a graphic representation of the idealized relationship, for a particular vehicle, between fluid pressure supplied to the rear brakes and the fluid pressure supplied to the front brakes under various loading conditions;

FIG. 5 is an enlarged fragmentary cross-sectional view of a portion of the proportioning piston and associated valve member embodied in the valve assembly shown in FIG. 1; and FIG. 6 is an enlarged cross-sectional view of the residual valve assembly incorporated in the structure shown in FIG. 1.

DESCRIPTION OF A PREFERRED EMBODIMENT

Referring now in detail to FIG. 1 of the drawings, a valve assembly 10, in accordance with one preferred embodiment of the present invention, is shown in operative association with a typical vehicular braking system 12 including a dual master cylinder 14 which is actuatable in a conventional manner by means of a foot operated brake pedal 16. The master cylinder 14 is operatively connected via fluid conduits 18 and 20 to the front wheel brake cylinders 22 and 24 of the brake system 12. Additionally, the master cylinder 14 is connected via conduit 26, the valve assembly 10 and conduits 28 and 30 to the rear wheel brake cylinders 32 and 34 of the brake system 12. As hereinafter will be described in detail, the valve assembly 10 is intended to modulate or proportion hydraulic fluid from the master cylinder 14 to the rear wheel brake cylinders 32, 34 and at the same time accommodate for variations in vehicle loading which might otherwise have the effect of causing the valve assembly 10 to deviate in its proportioning operation from the idealized pressure transmitted from the master cylinder 14 to the brake cylinders 22, 24 and 32, 34.

The valve assembly 10 is shown as comprising a valve housing 36 formed with an internally threaded inlet port 38 which is communicable with the conduit 26. Inlet port 38 is also communicable via a passage 40 with a proportioning valve bore 42 that is closed at its outer end by means of a threaded closure plug 44 which defines a bore or outlet port 46 communicable with the rear wheel brake cylinders 32, 34 via the aforementioned conduit 28. Means in the form of a suitable O-ring sealing element of the like 48 provides a fluid tight seal between the outer periphery of the closure plug 44 and the outer end of the valve bore 42. Disposed within the valve bore 42 is a proportioning valve assembly, generally designated by the numeral 50, the construction and operation of which will hereinafter be described.

The proportioning valve bore 42 is communicable via an outwardly extending fluid passage 52 with a residual valve assembly bore 54 adapted to operatively contain or hold a residual valve assembly, generally designated by the numeral 56. The outer (upper) end of the residual valve bore 54 is closed by means of a suitable threaded closure plug 58 having O-ring sealing element or the like 60. The valve bore 54 intersects a generally transversely extending poppet valve bore 62 which is closed at is outer (right) end by means of a threaded closure plug 64 and sealing element 66 and is adapted to operatively contain a poppet valve assembly, generally designated by the numeral 68, adjacent the inner or left end thereof.

The extreme inner end of the poppet valve bore 62 is connected via a reduced diameter fluid passage 70 with an annular chamber 72 which is closed at the lower end thereof by means of a generally cup-shaped annular closure plate 74 and O-ring sealing element 76. The upper end of the chamber 72 is formed with an upwardly extending blind bore 78 which is communicable with a transversely extending bore 80 closed at the outer end thereof by means of a closure plug 82 and sealing element 84. Disposed within the bore 80 is a plunger assembly, generally designated by the numeral 86, which operates in a manner hereinafter to be described.

Referring now in detail to the construction and operation of the proportioning valve assembly 50, as best seen in FIG. 1, said assembly includes a proportioning piston member, generally designated by the numeral 88, which is preferably of a construction disclosed in U.S. Pat. No. 3,423,936, assigned to the assignee of this application and which is incorporated by reference in the descriptive portion of this specification. The piston member 88 includes a generally cylindrically shaped body 90 which is formed with an enlarged diameter flange portion 92 around an intermediate portion thereof and which defines an annular shoulder 94 on the outer side thereof. The piston member 88 also includes an enlarged diameter head portion 96 that defines a seating or sealing surface 98 adapted for a sealing engagement with a resilient deformable valve member 100 which is best shown in FIG. 5. The valve member 100 and valve head section 96 are operative together to control the flow of fluid between the valve bore 42 and rear wheel and brake cylinders 32, 34. While the valve member 100 is preferably of a construction shown and described in the aforementioned U.S. Pat. No. 3,423,936, by way of a brief explanation, the member 100 includes a lip 102 which normally is inclined radially outwardly to engage the side wall of the valve bore 42 and acts to prevent flow thereby from the bore 42 into the outlet port 46. The shoulder 94 is engageable with a plurality of bosses 104 on the valve member 100 in a manner so as to provide communication between the valve bore 42 and the passage 46. The outer periphery of the valve member 100 is formed with a plurality of circumferentially spaced axially extending grooves 106, and the end of the valve member 100 is formed with a plurality of angularly spaced grooves 108 adapted to communicate with the grooves 106 to provide a flow path of fluid from the passage 46 into the interior of the valve bore 42 and, accordingly, when the fluid pressure in the passage 46 is greater than that in the bore 42, the pressure difference can deflect the lip 102 radially inwardly to permit the reverse flow of fluid from the brake cylinders 32, 34 into the bore 42.

The piston member 88 is normally located (as shown in FIG. 1) where the shoulder 94 enages the bosses 104 of the valve member 100, whereby the flow of fluid from the master cylinder 14 to the rear brake cylinders 32, 34 is unimpeded; however, at such time as a certain relative pressure level is obtained within the valve bore 42, the piston member 88 will move to the left, whereupon the surface 98 of the valve head 66 will engage the valve member 100 so as to block fluid flow from the proportioning valve assembly 50 to the brake cylinders 32, 34. In accordance with one of the principles of the present invention, the force or bias acting upon the piston member 98 to maintain the same in an open position, and thus provide unimpeded fluid flow to the brake cylinders 32, 34, is provided by a fluid spring primarily constituting the pressurized fluid within the chamber 72 and which is communicable with the valve bore 42 via the passage 122. Initially, the force or bias of such fluid spring is represented by the force $F_1$ which acts upon the cross-sectional area of the body 90 of the piston member 88. As the pressure, represented as $P_1$, from the master cylinder 14 is applied to the piston member 88, the member 88 is urged toward the left in FIG. 1, i.e., toward a position wherein the valve head 96 seats against the valve member 100; however, the piston member 88 will not attain this position until the bias force $F_1$ of the aforementioned fluid spring has been overcome. The magnitude of the inlet pressure $P_1$ from the master cylinder 14 at which closure of the valve assembly 50 occurs is preselected for the desired braking effect. Thus, closure will occur when $P_1 A$ is greater than $F_1$, where A is the cross-sectional area of the body 90' of the piston member 88. After the valve head 96 closes against the valve member 100, as the inlet pressure from the master cylinder 14 is increased, the pressure in the valve bore 42 will exceed the pressure in the outlet port 46 and the piston member 88 will be urged toward its open position. The pressure in the valve bore 42 will act on the piston member 88 over an effective area of B −A, where B is the area defined by the mean sealing diameter of the valve head 96 engaged with the valve member 100. The resulting force on the piston member 88 cooperates with the spring force $F_1$ to bias the piston member 88 toward its open position. After the valve head 96 is open, some of the increased fluid pressure transmitted to the valve bore 42 from the master cylinder 14 creates an opposing force to close the valve head 96; however, since the fluid pressure in the outlet port 46 acts on a larger area B than the fluid pressure in the valve bore 42, only a portion of the total increase in fluid pressure is required to close the valve head 96. This is the proportioning effect and it will respond to the following relationship:

$$P_1 \frac{(B-A)}{B} = P_2, \qquad (1)$$

where $P_1$ is the increase in pressure at the valve bore 42 from the master cylinder 14; $P_2$ is the increase in pressure at the outlet port 46 resulting from the increase $P_1$; and $$(P_2) B = P_1 (B-A) + F_1,$$

where $P_2$ is the pressure in the outlet port 46 and $P_1$ is the pressure from the master cylinder. Equation number (1) defines a proportional relationship between the inlet and outlet pressures during proportioning operation of the valve assembly 50, while Equation number (2) defines absolute values of the inlet and outlet pressures during the proportioning operation.

In accordance with the principles of the present invention, the valve assembly 10 is designed and constructed such that the magnitude of pressure at which the proportioning valve assembly 50 begins to operate will vary in order to compensate for different vehicle loading conditions. The desirability of this can be seen from the graphic representation in FIG. 4 wherein Curve A indicates the actual relationship between the rear brake pressure and the front brake (or master cylinder) pressure as would exist with no proportioning effect. Curves B-F indicate the idealized relationship between the rear and front brake pressures at zero, one-quarter, one-half, three-quarters and full vehicle loading, respectively. Maximum braking effectiveness can be obtained by operating along the curves B-F. A typical curve for a proportioning valve is indicated as 500 psi and provides compensation for weight transfer, most effectively, at a vehicle load between one-half and three-quarters load. Operation along Curve G, however, does not accommodate the other loading conditions as well. As discussed, the force $F_1$ applied to the piston member 88 by means of the fluid spring within the chamber 72 determines the pressure of initiation of the proportioning effect, and in the present invention, compensation for load variations is accomplished with varying the bias or effective force of the aforesaid fluid spring in accordance with the deceleration of the vehicle. With reference again to the FIG. 4, the Curves B-F each have ten points, each of which indicate a different deceleration rate (from 0.1G to 1G) attained by application of the corresponding brake pressure for a given u surface. To approximate each of these Curves B-F, there is an optimum point along Curve G at which proportioning should be initiated and this point can be determined by the relationship of the magnitude of the rear brake pressure and of vehicle deceleration. For example, Curve B in initiation of proportioning should occur at approximately 0.2G and at a rear brake pressure of around 220 psi. For full load, on the other hand, it should occur at approximately 0.7G and at a rear brake pressure of around 835 psi.

Referring now in detail to the construction and operation of the residual valve assembly 56, as best seen in FIG. 6, the valve assembly 56 includes a valve spool member 120 which comprises a generally cylindrically-shaped stem portion 123 that is formed with a radially outwardly extending flange portion 124 at the lower end. The upper side of the flange portion 124 defines a radial shoulder 126 against which the lower end of a helical coil spring 128 rests. The upper end of the spring 128 bears against an annular shoulder 130 on the closure plug 58 for retaining the spring 128 in a generally vertical orientation. The underside of the valve spool 120 is formed with a plurality of circumferentially spaced radially inwardly extending slots or recesses 132 which define with the upper side of a resilient or elastomeric ring-shaped valve member 134, flow passages between the inner periphery of the residual valve bore 54 and the passage 52. As illustrated, the valve member 134 is formed with a central annular opening 136 and is adapted to be supported upon an end wall 137 defined at the lower end of the valve bore 54. At such time as the pressure within the valve bore 42 and passage 52 reaches a predetermined magnitude, the valve spool member 120 and valve member 134 will be biased upwardly against the resistance of the spring 128, whereby to communicate fluid from the passage 52 into the chamber 72, (via the poppet valve assembly 68). The force or bias of the spring 128 is calculated such that the valve assembly 56 will not open until such time as the fluid pressure acting upon the piston member 88 biases the same to its closed position. At such time that the brake pressure is relieved in the passage 52, the spring 128 will bias the spool member 120 and valve member 134 downwardly to the position shown in FIG. 6. Due to the greater pressure which will be trapped above the valve member 134, the inner periphery thereof will be biased downwardly, as indicated by phantom lines in FIG. 6, whereby fluid may flow through the recesses 132 and thereafter downwardly through the opening 136 of the member 34 into the passages 52. Due to the natural resiliency of the valve member 34, at such time as the fluid pressure thereabove reaches a certain minimum value, the inner peripheral portion of the member 134 will be biased upwardly from the phantom line position in FIG. 6 to the solid line position shown in this figure, whereby to block any further fluid flow from the valve bore 54 into the passage 52.

Disposed adjacent the residual valve assembly 56 is the aforementioned poppet valve assembly 68. As best seen in FIG. 1, the assembly 68 includes a resilient or elastomeric valve member 138 which is of a generally cylindrical configuration and is mounted on a reciprocal valve stem 140, one end of which projects into the annular chamber 72 and operates in a manner hereinafter to be described. The valve member 138 and stem 140 are resiliently urged toward the left in FIG. 1 by means of a helical coil spring 142 which extends axially within the poppet valve bore 62. In particular, the valve member 138 is biased toward the left into sealing engagement with a radial shoulder 144 located at the extreme left end of the bore 62, as depicted in FIG. 1. One end of the spring 142 bears against the right side of a disc-shaped element 145 carried on the stem 140, while the opposite (right) end of the spring 142 bears against a spring retainer 146 located within the bore 62. As illustrated, the outer periphery of the valve member 138 is spaced radially inwardly from the inner periphery of the bore 62, whereby to provide for fluid flow around the outer periphery of the valve member 138 when the same is disengaged or spaced axially from the shoulder 144. The valve member 138 and stem 140 are normally held or maintained in a position spaced away from the shoulder 144 by means of a weighted element, generally designated by the numeral 150, that is operatively disposed within the chamber 72 and which will hereinafter be described. In this position fluid may flow from the bore 62 through the passage 70 into the chamber 72. At such time as the weighted element 150 undergoes predetermined movement within the chamber 72, the valve member 138 along with the stem 140 will be biased toward the left in FIG. 1 under the influence of the spring 142, whereupon the left end of the valve member 138 will sealingly engage the shoulder 144 to block further flow through the passage 70 into the chamber 72, as will hereinafter be described in connection with the overall operation of the valve assembly 10 of the present invention.

As best illustrated in FIG. 1, the weighted element 150 comprises a generally cylindrically shaped body 152 having a relatively pointed lower apex portion 154 that is nestingly received within a tapered blind bore 156 formed centrally within the enclosure plate 74. The apex portion 154 and bore 156 are axially aligned with the bore 78 formed within the upper end of the housing 36. The element 150 is also formed with a downwardly extending central blind bore 158 within which a support or lever assembly 160 is disposed. The assembly 160 includes an elongated leaf spring element 162 and a support arm or member 164. The leaf spring element 162 comprises a lower end portion 166 which is fixedly connected by means of suitable screws, bolts, rivets or the like 168 adjacent the lower end of the support member 164. The upper end of the leaf spring element 162 is formed with an outwardly and upwardly inclined leg portion 170 which is adapted to be normally engaged with the side wall or periphery 172 of the bore 78. The support member 164 extends from the lower end of the bore 158 to a position adjacent the upper end of the bore 178 and an intermediate portion of the support member 164 is formed with a generally U-shaped bend 174 adapted to engage the peripheral wall 176 of the bore 154, as illustrated. The support member 164 also includes an upper end portion 178 which is formed with a central opening 180 through which one end of an elongated cylindrical plunger member 182 extends. The plunger member 182 is longitudinally slidably received within a bore 184 formed in the plug 82. Means in the form of a suitable sealing element or the like 186 is disposed within a counterbore 188 of the bore 184 and is adapted to provide an airtight seal between the interior of the bore 178 and the bore 184. The outer end of the bore 184 is communicable via a vent passage 180 with the atmosphere, with the passage 190 being covered by an elastomeric sealing ring or the like 192.

The weighted element 150 is intended to move within the chamber 72 in a direction toward and away from the poppet valve assembly 68, as will hereinafter be described. In order to assure that the element 150 moves only along a predetermined longitudinal axis parallel to or along the longitudinal axis of the associated vehicle, means in the form of a pair of laterally spaced rollers 194 and 196 are located adjacent the upper end of the element 150, as best seen in FIGS. 2 and 3. The rollers 194, 196 are journal-supported upon the lower ends of a pair of shafts or pins 198 and 200, respectively, which have their upper ends secured within suitable blind bores 202 formed in the upper end of the housing 36. The rollers 194, 196 are located directly adjacent the diametrically opposite sides of an upwardly extending cylindrical portion 204 formed on the upper end of the element 150 and as such function to guide the element 150 for the aforesaid longitudinal movement, yet restrict any lateral movement of the element 150 during operation of the associated vehicle, as will be appreciated by those skilled in the art.

The valve assembly 10 of the present invention is intended to be mounted in a vehicle such that the longitudinal movement of the weighted element 150 is along or parallel to the longitudinal axis of the vehicle, with the plunger assembly 86 facing forwardly. The element 150 is normally held in its rearward position against the stem 140 of the poppet valve 68 by the leaf spring 162, thus maintaining communication between the chambers 72 and 62. The leaf spring 162 serves to keep valve assembly 68 open during the initial pressure range where the proportioning valve is not intended to operate. At very low hydraulic pressures, the upper end 170 of the spring 162 bears against the face 172, and the portion 174 presses against the bore 176, resulting in two forces being exerted against the element 150; the first force is applied at the lower extremity of the arm 164 and urges the element 150 to the left (as the latter is pivoted about the apex portion 154). A stronger second force is applied through the portion 174 and functions to maintain the element 150 against stem 140 and thus keep the valve assembly 68 open. As the brake pressure from the master cylinder is increased and communicated through the residual valve 56 to the chamber 72, the pressure begins to act on plunger 182 to bias it to the left against the upper end of the member 164, resulting in the portion 174 moving out of contact with the periphery 176 of the bore 178, and abut against the upper end of the spring element 162, so that in effect, the member 164 and spring 162 form a single rigid assemblage whose upper end is engaged by the head of the plunger member 182 and the lower end of which is disposed within the bore 178. Accordingly, the portion 170 becomes an intermediate fulcrum, producing a new lever ratio. Thus, leftward movement of the plunger member 182 against the upper end of the member 164 tends to produce an approximately 35 fold movement of the upper end of the element 150 against the stem 140. As the master cylinder pressure is increased and valve 68 is kept open, the hydraulic pressure is permitted to communicate with the chamber 72, which pressure is reduced only slightly by the residual valve 56 whose purpose is to allow the proportioning valve to go into lap (closed) position which in turn causes a slightly lower line pressure to the rear wheel brake cylinders 32, 34, although such pressure difference is negligible. The advantage the proportioning valve being in lap position before the valve 68 closes is that the fluid volume in chamber 72 is not varied by the closing of the proportioning valve plunger, since a movement of the plunger 88 to the left would increase the entrapped pressure and would thereby change the split point (the point of divergence from line A) from the desired location illustrated in the graph. Utilizing the main principle of the device, namely, that a lower deceleration of the vehicle relative to a certain brake pressure indicates the loading of the vehicle, the hydraulic pressure in chamber 72 is allowed to build up and this same pressure urging the plunger 182 toward the left requires a higher decelerating force to move weight 152 to the left to allow the poppet valve 68 to close. Thus, a heavier vehicle load and a higher pressure trapped in chamber 72 causes the split point to be higher and a lighter load and lower pressure causes the split point to be lower. After the split point pressure $F_1$ in chamber 72 remains constant and as the pressure from the master cylinder builds up, the rear line pressure increases at a lower rate in a ratio indicated by line G whose split point diverging from line A varies according to loading of the vehicle as described.

It will be noted that due to compound leverage of the member 164 and weight 152, the movement of plunger 182 is extremely small. For example, a closing movement of valve 68 of 0.035 inch to the left would require only a movement of 0.001 inch of plunger 182 to the right. The result of this is that the frictional resistance is minimal so that the performance of the proportioning valve can be held within closer limits. Another factor in making the valve more accurate or more sensitive is the reduction of friction acting on the piston member 88 by using the hydraulic fluid in chamber 72 as a spring against plunger 88, thus eliminating an otherwise necessary hydraulic seal. Additionally, the friction of the seal 114 is minimized to the extreme in that at or near the critical split point, the hydraulic pressures on both sides of the seal 114 are balanced.

Reduction of the brake pressure in the master cylinder 14 will cause the piston member 88 to move to the left into sealing engagement or embedment with the valve member 100 so that a small amount of fluid from the rear line 28 may be drawn into the chamber surrounding the right end of member 88 and thereby reduce the pressure in the rear brake cylinders to descend along line G of the graph for some distance, similar to the function of prior proportioning valves related to the one shown. With a small embedment permitted by the end stop or a smaller volume of fluid in chamber 72 where the hydraulic spring has a higher rate, the descent of the rear wheel pressure along line G is for a shorter distance after which the rear line pressure is released past the lip 102 of seal 100 to be relieved together with the master cylinder pressure.

While it will be apparent that the preferred embodiment herein illustrated is well calculated to fulfill the objects stated above, it will be appreciated that the present invention is susceptible to modification, variation, and change without departing from the scope of the invention.

I claim:

1. In an automotive vehicle having a source of hydraulic fluid and front and rear wheel hydraulically actuated brake systems, the improvement comprising:
   proportioning valve means in one of the systems actuable for modulating the brake pressure in that one system to provide for a reduced brake effect at the rear wheels relative to that at the front wheels to compensate for weight transfer during braking, said proportioning valve means comprising piston means movable between positions opening and closing a flow path from said fluid source to said one brake system,
   bias means including a chamber filled with pressurized fluid and providing a force to move said piston means toward a position opening said flow path from said fluid source to said one brake system,
   said chamber being in direct communication with said piston means through a passageway, said pressurized fluid in said chamber applying a direct force on said piston means,
   deceleration means disposed in said chamber for controlling the magnitude of said pressure in said chamber as a function of the magnitude of deceleration of the vehicle,
   said deceleration means including a weighted element and means supporting said element for pivotal movement between first and second positions, and
   valve means for selectively communicating said fluid source with said chamber filled with fluid, said valve means being open when said weighted element is in said first position and being actuable to a closed condition blocking communication between said fluid source and said chamber in response to said weighted element moving to said second position,
   whereby the modulating effect of said proportioning valve means compensates for variations in loading of the vehicle.

2. The invention as set forth in claim 1 which includes means for preventing said deceleration means from operating below a preselected magnitude of fluid pressure transmitted to said one brake system.

3. The invention as set forth in claim 1 which includes second valve means for controlling the flow of fluid from said source to said fluid chamber.

4. The invention as set forth in claim 3 wherein said second valve means is operable to assure that said piston means is moved toward said position closing said flow path prior to said first valve means moving to a position blocking fluid flow from said source to said fluid chamber.

5. In an automotive vehicle having a source of pressurized fluid and front and rear wheel fluid actuated brake systems,
   proportioning valve means in one of the systems actuable for modulating the brake pressure in that one system to provide for a reduced brake effect at the rear wheels relative to that at the front wheels to compensate for weight transfer during braking,
   said proportioning valve means comprising a proportioning piston and an associated valve member operatively connected in said one system to modulate the brake pressure therein upon attainment of a determinable magnitude of brake pressure,
   bias means including a fluid chamber for biasing said piston member toward a position providing an open flow path from said source to said one system,
   a member in said chamber supported for movement in response to the deceleration of the vehicle,
   first valve means normally fluid communicating said chamber with said source of pressurized fluid whereby the magnitude of fluid pressure in said chamber is determined by that pressure acting on said piston member by said fluid source,
   said member operatively connected with said first valve means whereby said first valve means will be moved toward a position blocking communication between said chamber and said fluid source in response to movement of said member in response to deceleration of the vehicle,
   second valve means for controlling the flow of fluid from said source to said fluid chamber, said second valve means permitting a preselected bleedback of pressurized fluid from said fluid chamber toward said source of fluid pressure,
   whereby a predetermined fluid pressure will be retained in said chamber to provide a preselected bias force against said proportioning piston.

6. The invention as set forth in claim 5 wherein said second valve means is operable to assure that said piston means is moved toward said position closing said flow path prior to said first valve means moving to a position blocking fluid flow from said source to said fluid chamber.

7. The invention as set forth in claim 5 wherein said member comprises a weighted element disposed in said chamber and movable therein in response to deceleration of the vehicle.

8. The invention as set forth in claim 7 wherein said weighted element is cooperable with said first valve means to permit movement of said first valve means to a closed position in response to deceleration of the associated vehicle.

9. The invention as set forth in claim 5 which includes means for preventing operation of said member below a preselected magnitude of fluid pressure transmitted to said one brake system.

10. The invention as set forth in claim 9 wherein said means for preventing said member to operate below the preselected fluid pressure comprises a plunger element exposed at one end thereof to the atmosphere and at the other end thereof to the fluid pressure communicated from said source thereof.

11. The invention as set forth in claim 5 which includes means providing a fluid seal between said fluid chamber and a valve bore within which said proportioning piston is disposed, and wherein the pressure in said chamber and said valve bore are equal.

12. In an automotive vehicle having front and rear brake systems operated by fluid pressure, the improvement comprising:
brake pressure proportioning means for modulating the brake pressure to provide a relatively low pressure in the rear brakes and a relatively higher pressure in the front brakes to compensate for weight transfer during braking,
said proportioning means comprising a proportioning valve having an open condition and a closed condition,
spring means comprising a volume of pressurized fluid for keeping said proportioning valve open with a preselected bias,
said spring means being responsive to said fluid pressure to increase the bias on said proportioning valve and thereby increase the resistance to movement of said proportioning valve toward said closed condition,
control valve means actuable to a closed position for interrupting communication of said fluid pressure to said spring means to prevent further increasing of said bias against said proportioning valve and deceleration sensing means for actuating said control valve means to said closed position in response to vehicle deceleration, and
second valve means for controlling the flow of fluid from a source of fluid pressure to said spring means, said second valve means permitting a preselected bleedback of pressurized fluid from said spring means toward said source of fluid pressure.

13. The invention as set forth in claim 12 wherein said second valve means is operable to assure that said proportioning valve is moved toward said closed condition prior to said control valve means moving to a position blocking fluid flow from said source to said spring means.

14. The invention as set forth in claim 12 wherein said deceleration sensing means comprises a weighted element movable in response to deceleration of the vehicle.

15. The invention as set forth in claim 14 wherein said weighted element is cooperable with said control valve to permit movement of said control valve to a closed position in response to deceleration of the associated vehicle.

16. The invention as set forth in claim 12 which includes means for preventing said deceleration sensing means from operating below a preselected magnitude of fluid pressure transmitted to said one brake system.

17. The invention as set forth in claim 16 wherein said means for preventing said deceleration sensing means from operating below the preselected fluid pressure comprises a plunger element exposed at one end thereof to the atmosphere and at the other end thereof to the fluid pressure.

18. The invention as set forth in claim 12 which includes seal means providing a fluid seal between said spring means and a valve bore within which said proportioning means is disposed, and wherein the pressure in said bore and said spring means are equal.

19. In an automotive vehicle having a source of hydraulic fluid and front and rear wheel hydraulically actuated brake systems, the improvement comprising:
proportioning valve means in one of the systems actuable for modulating the brake pressure in that one system to provide for a reduced brake effect at the rear wheel relative to that at the front wheels to compensate for weight transfer during braking,
said proportioning value means comprising piston means movable between positions opening and closing a flow path from said fluid source to said one brake system,
bias means including a fluid spring providing a force to move said piston means toward a position opening said flow path,
deceleration means for controlling the magnitude of said fluid spring as a function of the magnitude of deceleration of the vehicle,
said deceleration means including a weighted element and means supporting said element for pivotal movement between first and second positions, and
first valve means for selectively communicating said fluid source with said fluid spring, said first valve means being open when said weighted element is in said first position and being actuable to a closed condition blocking communication between said fluid source and said spring in response to said weighted element moving to said second position,
said means supporting said element for pivotal movement having a plunger means and providing a mechanical advantage whereby the amount of movement of said plunger means can be less than the amount of movement of said weighted element moving between said first and second positions,
second valve means for controlling the flow of fluid from said source to said fluid spring, said second valve means permitting a preselected bleedback of pressurized fluid from said fluid spring toward said source of fluid pressure,
whereby the modulating effect of said proportioning valve means compensates for variations in loading the vehicle.

20. The invention as set forth in claim 19 which includes means for preventing said deceleration means from operating below a preselected magnitude of fluid pressure transmitted to said one brake system.

21. The invention as set forth in claim 19 wherein said second valve means is operable to assure that said piston means is moved toward said position closing said flow path prior to said first valve means moving to a position blocking fluid flow from said source to said fluid spring.

22. In an automotive vehicle having a source of hydraulic fluid and front and rear wheel hydraulically actuated brake systems, the improvement comprising:

proportioning valve means in one of the systems actuable for modulating the brake pressure in that one system to provide for a reduced brake effect at the rear wheels relative to that at the front wheels to compensate for weight transfer during braking, said proportioning valve means comprising piston means movable between positions opening and closing a flow path from said fluid source to said one brake system, bias means including a fluid spring providing a force to move said piston means toward one of said positions, deceleration means for controlling the magnitude of said fluid spring as a function of the magnitude of deceleration of the vehicle, said deceleration means including a weighted element and means supporting said element for pivotal movement between first and second positions, and first valve means for selectively communicating said fluid source with said fluid spring, said first valve means being open when said weighted element is in said first position and being actuable to a closed condition blocking communication between said fluid source and said spring in response to said weighted element moving to said second position, second valve means for controlling the flow fluid from said source to said fluid spring, said second valve means permitting a preselected bleedback of pressurized fluid from said fluid spring toward said source of fluid pressure, whereby the modulating effect of said proportioning valve means compensates for variations in loading of the vehicle.

* * * * *

UNITED STATES PATENT OFFICE
CERTIFICATE OF CORRECTION

PATENT NO. : 3,980,343
DATED : September 14, 1976
INVENTOR(S) : William Stelzer

It is certified that error appears in the above-identified patent and that said Letters Patent are hereby corrected as shown below:

Column 4, line 30: "98" should be --88--.

Column 4, line 37: "90" should be --90'--.

Column 5, line 62: "835" should be --385--.

Column 6, line 36: "34" should be --134--.

Column 7, line 50: "180" should be --190--.

Column 8, lines 32 and 37: "178" should be --158--.

Column 9, line 68: insert --fluid-- prior to "pressure". (Claim 1, line 22)

Column 12, line 32: "wheel" should be --wheels--. (Claim 19, line 7)

Signed and Sealed this

Eighth Day of March 1977

[SEAL]

Attest:

RUTH C. MASON
Attesting Officer

C. MARSHALL DANN
Commissioner of Patents and Trademarks